US012305448B2

(12) United States Patent
Yildiz et al.

(10) Patent No.: US 12,305,448 B2
(45) Date of Patent: May 20, 2025

(54) FOLDING LADDER

(71) Applicant: WITTUR HOLDING GMBH, Bayern (DE)

(72) Inventors: Oguzhan Yildiz, Istanbul (AR); Ozan Tosun, Istanbul (AR); Turgut Baris Ergen, Istanbul (AR); Mesut Selek, Istanbul (AR)

(73) Assignee: WITTUR Holding GMBH, Bayern (DE)

( * ) Notice: Subject to any disclaimer, the term of this patent is extended or adjusted under 35 U.S.C. 154(b) by 934 days.

(21) Appl. No.: 17/428,521

(22) PCT Filed: Dec. 5, 2019

(86) PCT No.: PCT/IB2019/060469
§ 371 (c)(1),
(2) Date: Aug. 4, 2021

(87) PCT Pub. No.: WO2020/174274
PCT Pub. Date: Sep. 3, 2020

(65) Prior Publication Data
US 2022/0090448 A1 Mar. 24, 2022

(30) Foreign Application Priority Data
Feb. 28, 2019 (IT) ........................ 102019000002885

(51) Int. Cl.
*E06C 1/383* (2006.01)
*E06C 1/06* (2006.01)
*E06C 7/08* (2006.01)

(52) U.S. Cl.
CPC ................ *E06C 1/383* (2013.01); *E06C 1/06* (2013.01); *E06C 7/082* (2013.01)

(58) Field of Classification Search
CPC . E06C 1/383; E06C 1/06; E06C 7/082; E06C 9/085
See application file for complete search history.

(56) References Cited

U.S. PATENT DOCUMENTS 704,123 A * 7/1902 Scott ........................ E06C 1/383 182/160
3,439,776 A * 4/1969 Scheerer ................. E06C 1/383 182/160
(Continued)

FOREIGN PATENT DOCUMENTS

CH 137708 A 1/1930
CN 207004417 U * 2/2018
(Continued)

OTHER PUBLICATIONS

CN207004417U English translation (Year: 2018).*
(Continued)

*Primary Examiner* — Rodney Mintz
(74) *Attorney, Agent, or Firm* — Barnes & Thornburg, LLP; Tina M. Dorr

(57) ABSTRACT

Folding ladder (1), in particular for accessing the cavity of a lift shaft comprising: a first side rail (2) and a second side rail (3) that are parallel; a plurality of rungs (10); a stop (15) located on the first side rail (2); a locking member (16) located on the second side rail (3); a locking arm (34) having a first end portion (34*a*) pivotally attached to the first side rail (2) and a second end portion (34*b*) that is movable between an unlocking position in which it is magnetically coupled to the stop (15) so that the locking arm (34) abuts the first side rail (2), and a locking position in which it is magnetically coupled to the locking member (16) so that the locking arm (34) is diagonally arranged with respect to both the side rails (2, 3).

10 Claims, 3 Drawing Sheets

(56) References Cited

U.S. PATENT DOCUMENTS

| | | | | |
|---|---|---|---|---|
| 6,536,558 | B2 * | 3/2003 | Price | E06C 1/383 182/162 |
| 2002/0112920 | A1 | 8/2002 | Price | |
| 2013/0037350 | A1 * | 2/2013 | Geiselman, III | E06C 7/16 182/159 |
| 2019/0136627 | A1 | 5/2019 | Ikonen | |

FOREIGN PATENT DOCUMENTS

| | | | |
|---|---|---|---|
| CN | 207017929 | U | 2/2018 |
| DE | 4410634 | A1 | 9/1995 |
| EP | 3431701 | A1 | 1/2019 |
| JP | S51115794 | U | 9/1976 |
| RU | 2671274 | C2 | 10/2018 |

OTHER PUBLICATIONS

English Translation of Decision on Grant of RU Application No. 2020117046/03(028419) Issued Dec. 20, 2021, 6 Pages.

English Translation of Search Report of RU Application No. 2020117046/03(028419) Search Completed Dec. 2, 2021, 2 pages.

* cited by examiner

FOLDING LADDER

TECHNICAL FIELD

The present invention relates to a folding ladder.

In particular, the folding ladder is employable to access the cavity of a lift shaft. When the ladder is not in use, it is placed next to the lowest landing door of the lift plant.

BACKGROUND ART

There exist several solutions of ladder that may be laterally folded in order to reduce the occupied space when the ladder is not in use.

For example, document US 2002/0112920 discloses a folding ladder in which the rungs are pivotally attached to both the side rails and movable between a use position in which they are substantially perpendicular to the side rails, and a rest position in which they are substantially parallel to the side rails.

The ladder is also equipped with a locking member diagonally arranged with respect to the side rails when the ladder is in use. The locking member is composed by two articulated arms, each pivotally attached to one of the side rails. The arms are hinged together at a common point where it is placed a stop that prevents the two arms from pivoting relative to each other beyond a locking position.

DISCLOSURE OF THE INVENTION

In this context, the technical task underlying the present invention is to propose a folding ladder, which overcomes the drawbacks in the prior art as described above.

In particular, the aim of this invention is to make available a folding ladder having an increased stability with respect to the known solutions, and achieving a higher level of safety.

The technical task and the aims specified are substantially achieved by a folding ladder according to the attached claims.

BRIEF DESCRIPTION OF DRAWINGS

This description will be given below with reference to the attached drawings, provided solely for illustrative and therefore non-limiting purposes, in which.

DETAILED DESCRIPTION OF PREFERRED EMBODIMENTS OF THE INVENTION

With reference to the figures, number 1 indicates a folding ladder, for example to be employed for accessing the cavity of a lift shaft. The folding ladder 1 comprises a first side rail 2 and a second side rail 3 that are parallel. In particular, they have a main direction of development A.

Both the first side rail 2 and the second side rail 3 have a U-shaped cross-section and are disposed open toward each other.

Figure 2:
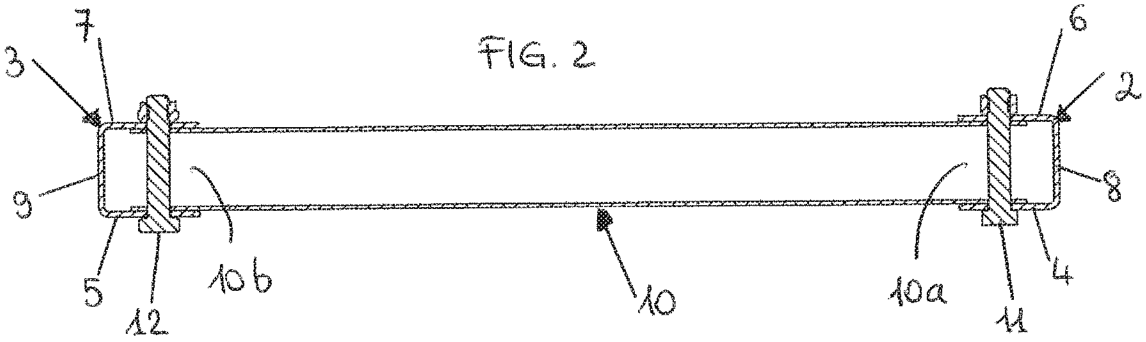
FIG. 2 is a section view of the folding ladder according to line XX of FIG. 1(*a*)

In particular, both the first side rail 2 and the second side rail 3 comprises a corresponding front leg 4, 5, a corresponding rear leg 6, 7 and a corresponding web 8, 9 connecting the front leg 4, 5 and the rear leg 6, 7 (see FIG. 2).

These side rails 2, 3 are preferably made of steel.

The folding ladder 1 comprises a plurality of rungs 10.

Figure 1:
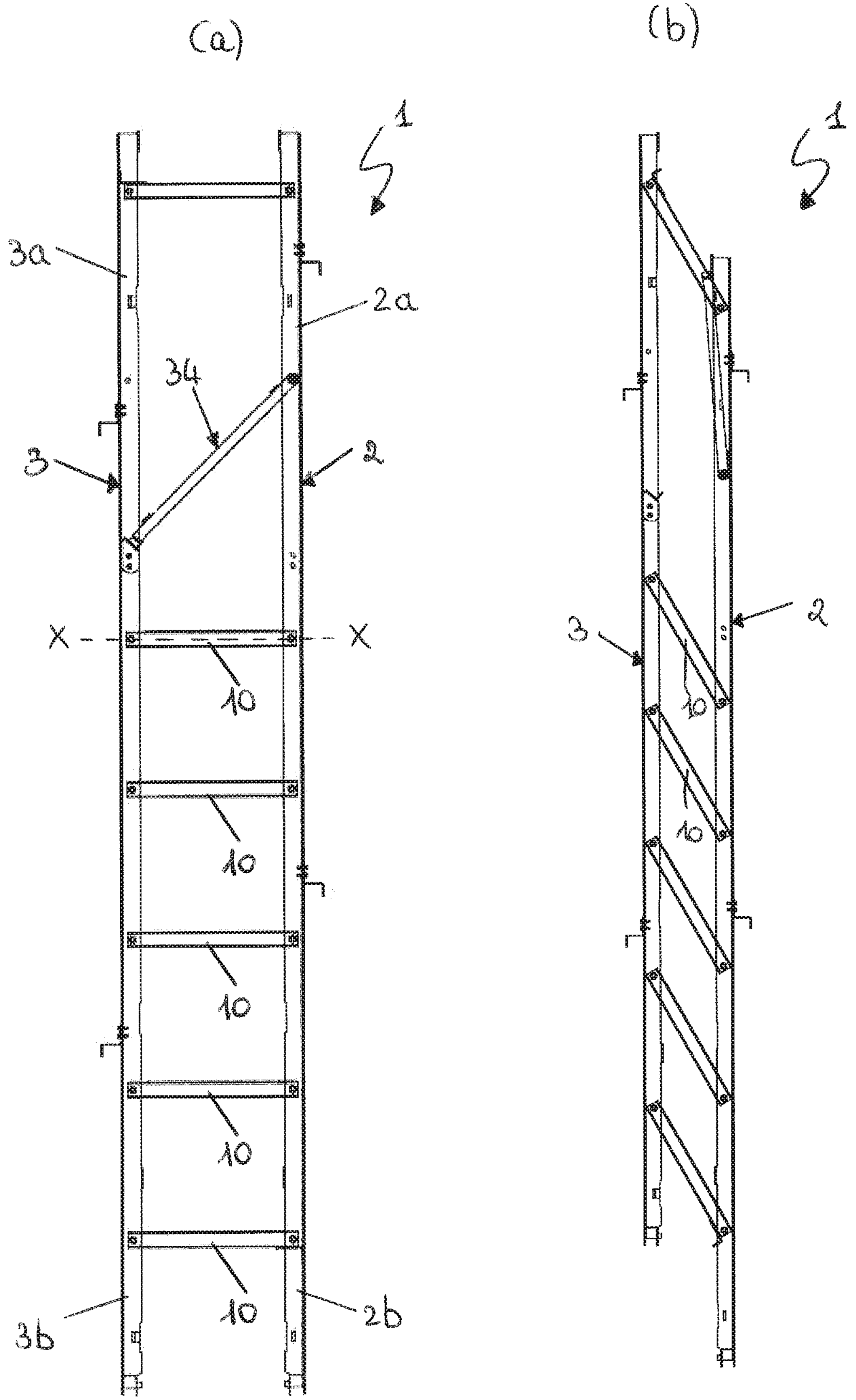
FIGS. 1(*a*) and 1(*b*) illustrates a folding ladder, respectively in an open configuration and in an intermediate configuration between the open configuration and a closed configuration, according to the present invention.

Each rung 10 has a first end portion 10*a* pivotally attached to the first side rail 2 and a second end portion 10*b* pivotally attached to the second side rail 3 in such a way that each rung 10 is movable between:

- a use position in which the rung 10 is substantially perpendicular to both the side rails 2, 3 (see FIG. 1(*a*));
- a rest position in which the rung 10 is substantially parallel to both the side rails 2, 3.

In particular, when the rungs 10 are in the use position, the folding ladder 1 is in an open configuration, with the side rails 2, 3 that are laterally spaced. By contrast, when the rungs 10 are in the rest position, the folding ladder 1 is in a closed configuration, with the side rails 2, 3 abutting one another.

Preferably, when the rungs 10 are in the rest position they are housed or nested within the side rails 2, 3 thanks to the U-shaped cross-section of the latter.

According to one embodiment of the invention, illustrated in FIG. 2, the first end portion 10*a* of each rung 10 is fitted and pivotally screwed in the U-shaped cross-section of the first side rail 2 by a first screw 11 extending from the corresponding rear leg 6 to the corresponding front leg 4, or vice versa, fixed by a nut.

Analogously, the second end portion 10*b* of each rung 10 is fitted and pivotally screwed in the U-shaped cross-section of the second side rail 3 by a second screw 12 extending from the corresponding rear leg 7 to the corresponding front leg 5, or vice versa, fixed by a nut.

According to an alternative embodiment of the invention (not illustrated), the first end portion 10*a* of each rung 10 is fitted and pivotally screwed in the U-shaped cross-section of the first side rail 2 by a first rear pin extending from the corresponding rear leg 6 and a first front pin extending from the corresponding front leg 4.

Analogously, the second end portion 10*b* is fitted and screwed in the U-shaped cross-section of the second side rail 3 by a second rear pin extending from the corresponding rear leg 7 and a second front pin extending from the corresponding front leg 5.

Each of the rear pins or each of the front pins crosses a through-hole leaving a backlash.

Preferably, each rung 10 consists of a tubular elongated element having a square cross-section or rectangular cross-section or circular cross-section. Alternatively, each rung 10 has a U-shaped cross-section.

Figure 3:
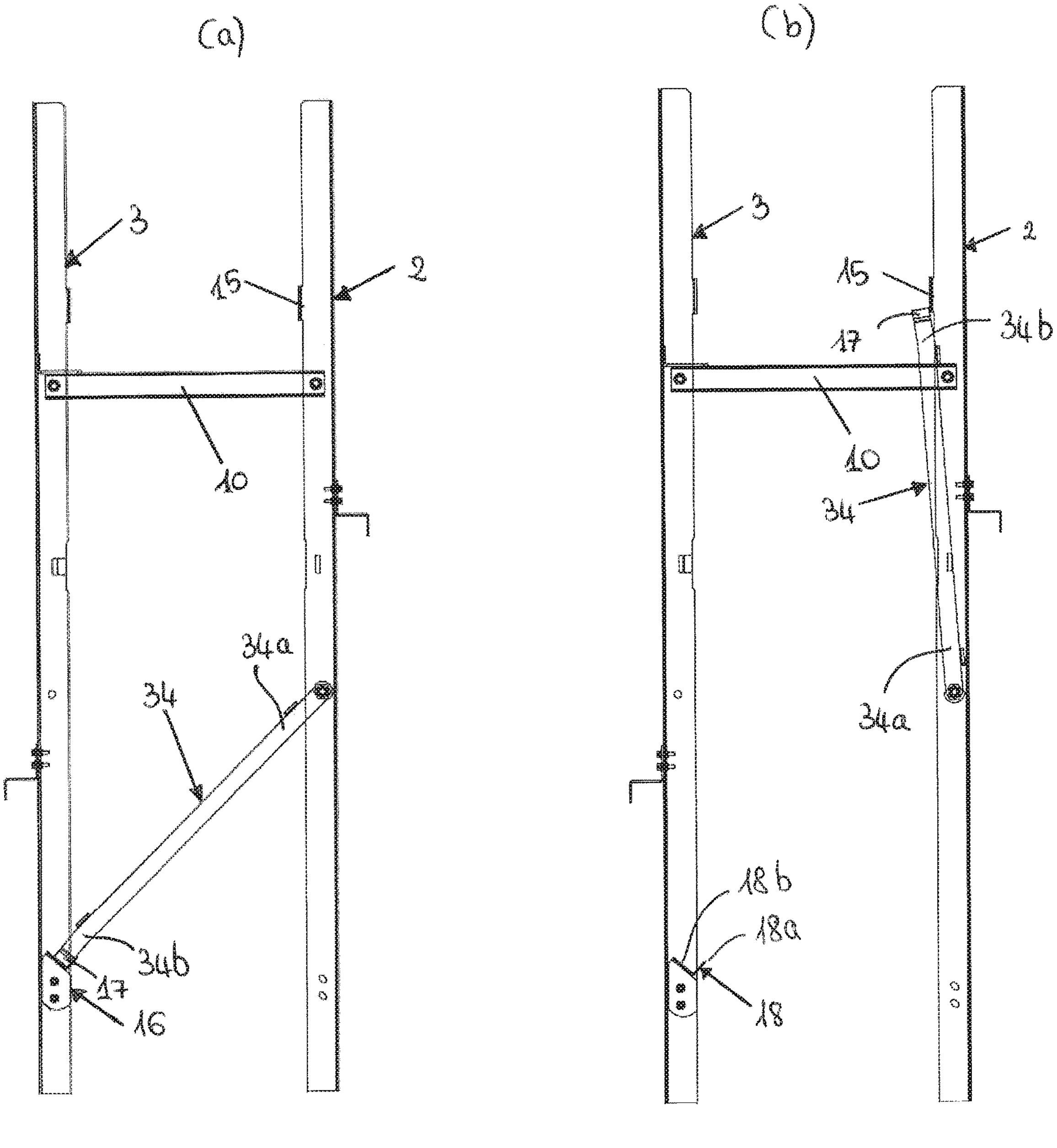
FIGS. 3(*a*) and 3(*b*) respectively illustrates a locking position and an unlocking position of a locking arm of the folding ladder of FIG. 1.

The folding ladder 1 also comprises a locking arm 34 having a first end portion 34*a* pivotally attached to the first side rail 2 and a second end portion 34*b* that is free and, due to the rotation of the first end portion 34*a*, can move between:

- an unlocking position, in which it is magnetically coupled to a stop 15 located on the first side rail 2 (see FIG. 3(*b*));
- a locking position, in which it is magnetically coupled to a locking member 16 located on the second side rail 3 (see FIG. 3(*a*)).

The magnetical couplings introduced above are obtained thanks to:

- the arrangement of a permanent magnet 17, for example a Neodymium magnet, in the second end portion 34*b* of the locking arm 34;
- the choice of a ferromagnetic material, for example steel, both for the stop 15 and the locking member 16.

In particular, when the second end portion 34*b* is in the unlocking position, the locking arm 34 abuts the first side rail 2.

When the second end portion 34*b* is in the locking position, the locking arm 34 is diagonally arranged with respect to both the side rails 2, 3.

It must be noticed that locking position of the second end portion 34*b* can occur only when the folding ladder 1 is in the open configuration.

Preferably, the locking member 16 comprises an L-shaped bracket 18 having two limbs 18*a*, 18*b* projecting from the second side rail 3.

When the folding ladder 1 is open and locked, the permanent magnet 17 is arranged in the corner defined by the two limbs 18*a*, 18*b* of the L-shaped bracket 18.

In this configuration the folding ladder 1 cannot fold since there are two retaining forces:

- magnetical coupling of the permanent magnet 17 with the locking member 16;
- mechanical engagement of the second end portion 34*b* of the locking arm 34 within the L-shaped bracket 18.

In the embodiment disclosed and illustrated herewith, the stop 15 consists in a plate or a plane projection of the first side rail 2.

In the embodiment disclosed and illustrated herewith, the locking arm 34 is fixed to the upper part 2*a* of the first side rail 2. Alternatively, the locking arm 34 is fixed to the lower part 2*b* of the first side rail 2.

According to one embodiment, on the first side rail 2 is applied a first magnetic element and on the second side rail 3 is applied a second magnetic element.

These magnetic elements are mutually located in such a way that, when the folding ladder 1 is in a closed configuration, they are magnetically coupled together.

Preferably, on the first side rail 2 is applied also a third magnetic element and on the second side rail 3 is applied a fourth magnetic element that are also magnetically coupled together when the folding ladder 1 is in the closed configuration.

Preferably, the first magnetic element and the second magnetic element are located in the upper parts 2*a*, 3*a* of the side rails 2, 3, while the third magnetic element and the fourth magnetic element are located in the lower parts 2*b*, 3*b* of the side rails 2, 3.

Preferably, each rung 10 is equipped with limiting brackets, 28 that allow pivoting in one direction, preventing pivoting in the opposite direction.

For example, the allowed direction is clockwise, while the prevented direction is counter-clockwise, or vice versa.

Figure 4:
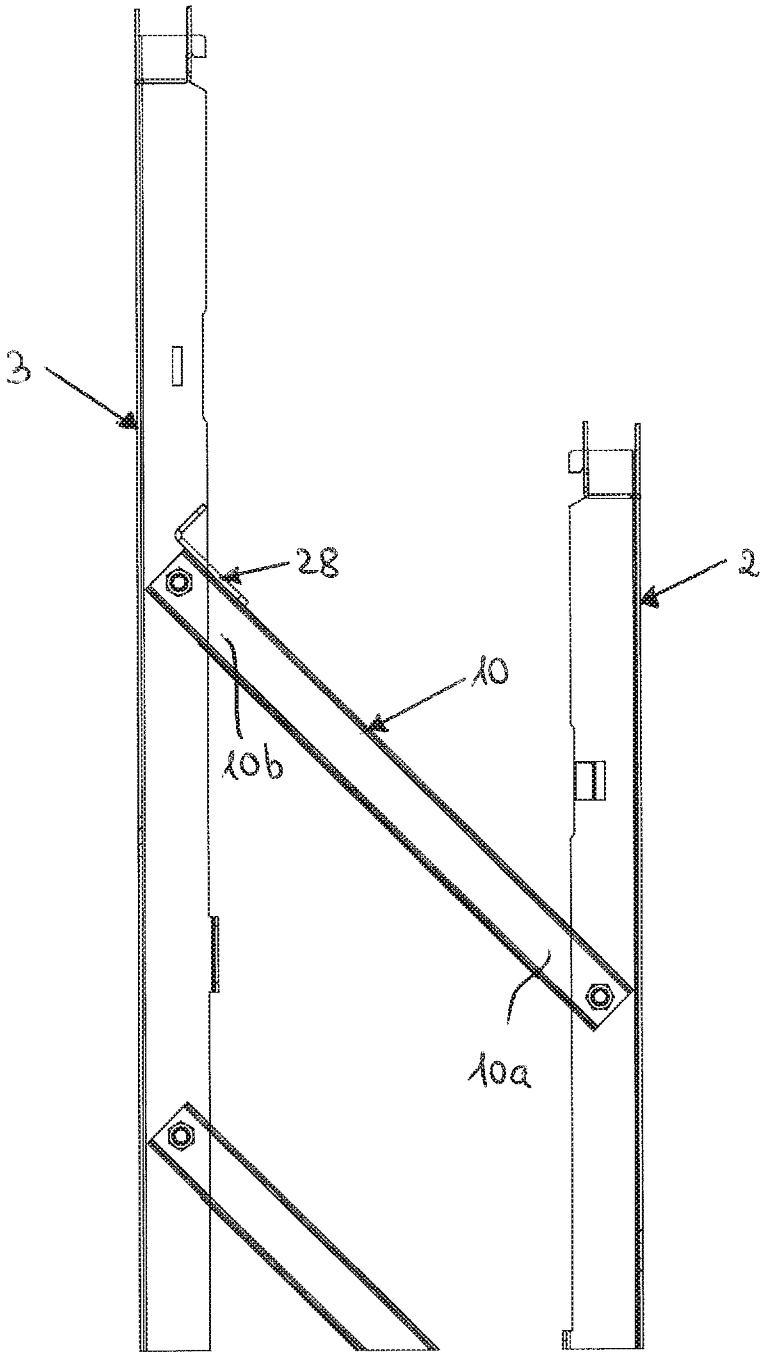
FIG. 4 illustrates the folding ladder of FIG. 1, enlarged in correspondence of a rung.

For example, a first limiting bracket 28 is an L-shaped bracket integrally mounted on the first end portion 10*a* of the rung 10, a second limiting bracket 28 is an L-shaped bracket integrally mounted on the second end portion 10*b* of the rung 10 (see FIG. 4).

The first and the second limiting brackets 28 are identical but they are mounted in a reverse arrangement with respect to the rung 10.

The characteristics of the folding ladder, according to the present invention, are clear as are the advantages.

In particular, thanks to the pivoting rungs, the ladder can be easily folded in order to reduce the occupied space when not in use.

The ladder is retained in its closed configuration thanks to the presence of pair of magnetic elements on the side rails, that are magnetically coupled.

In addition, when the folding ladder is open and locked, it cannot fold thanks to magnetic and mechanical retain means.

The invention claimed is:

1. A folding ladder (1) for accessing a cavity of a lift shaft comprising:

- a first side rail (2);
- a second side rail (3) that is parallel to the first side rail (2);
- a plurality of rungs (10), each rung (10) of the plurality of rungs having a first end portion (10*a*) pivotally attached to the first side rail (2) and a second end portion (10*b*) pivotally attached to the second side rail (3) in such a way that each rung (10) of the plurality of rungs is movable between a use position in which each rung of the plurality of rungs is substantially perpendicular to both the side rails (2, 3) while said side rails are laterally spaced, and a rest position in which each rung of the plurality of rungs is substantially parallel to both the side rails (2, 3) while said side rails abut one another;
- a locking arm (34) having a first end portion (34*a*) pivotally attached to the first side rail (2);
- a stop (15) located on the first side rail (2); and
- a locking member (16) located on the second side rail (3), the locking arm (34) having a second end portion (34*b*) that is movable between an unlocking position in which the second end portion (34*b*) of the locking arm (34) is magnetically coupled to said stop (15) so that the locking arm (34) abuts the first side rail (2), and a locking position in which the second end portion (34*b*) of the locking arm (34) is magnetically coupled to said locking member (16) so that the locking arm (34) is diagonally arranged with respect to both the side rails (2, 3);
- wherein the second end portion (34*b*) of the locking arm (34) includes a permanent magnet (17) positioned thereon, the locking member (16) comprises a L-shaped bracket (18) made of steel and having two limbs (18*a*, 18*b*) projecting from the second side rail (3),
- wherein the permanent magnet (17) is located in a corner defined by the two limbs (18*a*, 18*b*) of the L-shaped bracket (18) in the locking position.

2. The folding ladder (1) according to claim 1, wherein said stop (15) consists in a plate or a plane projection of the first side rail (2).

3. The folding ladder (1) according to claim 1, in which each rung (10) of the plurality of rungs further comprises a first limiting bracket (28) integrally mounted on the first end portion (10*a*) of each rung (10) and a second limiting bracket (28) integrally mounted on the second portion (10*b*) of each rung (10).

4. The folding ladder (1) according to claim 1, in which the first side rail (2) and the second side rail (3) have a U-shaped cross-section and are disposed open toward each other.

5. The folding ladder (1) according to claim 1, wherein the stop (15) is made of a ferromagnetic material.

6. The folding ladder (1) according to claim 5, wherein the permanent magnet (17) is a Neodymium magnet.

7. The folding ladder (1) according to claim 5, wherein the stop (15) and the locking member (16) are made of steel.

8. The folding ladder (1) according to claim 1, further comprising at least a first magnetic element and a second magnetic element, respectively located on the first side rail (2) and on the second side rail (3) in a mutual position so that, when the folding ladder (1) is in a closed configuration, the first magnetic element and the second magnetic element are magnetically coupled together.

9. The folding ladder (1) according to claim 8, further comprising a third magnetic element and a fourth magnetic element, respectively located on the first side rail (2) and on the second side rail (3) in a mutual position so that, when the folding ladder (1) is in the closed configuration, the third magnetic element and the fourth magnetic element are magnetically coupled together.

10. The folding ladder (1) according to claim 9, wherein the first magnetic element and the second magnetic element are located in upper parts (2*a*, 3*a*) of the side rails (2, 3), the third magnetic element and the fourth magnetic element being located in lower parts (2*b*, 3*b*) of the side rails (2, 3).

* * * * *